July 23, 1963  G. M. ROSENBERRY, JR  3,098,959
STARTING CIRCUIT FOR A SYNCHRONOUS MOTOR
Filed Jan. 6, 1961  4 Sheets-Sheet 1

ROTATING PARTS

AC SOURCE

INVENTOR
GEORGE M. ROSENBERRY JR

BY *James R. Campbell*

ATTORNEY

July 23, 1963   G. M. ROSENBERRY, JR   3,098,959
STARTING CIRCUIT FOR A SYNCHRONOUS MOTOR
Filed Jan. 6, 1961   4 Sheets-Sheet 3

INVENTOR
GEORGE M. ROSENBERRY JR.
BY James R. Campbell
ATTORNEY

ROTATING PARTS

United States Patent Office 3,098,959
Patented July 23, 1963

3,098,959
STARTING CIRCUIT FOR A SYNCHRONOUS MOTOR
George M. Rosenberry, Jr., Schenectady, N.Y., assignor to General Electric Company, a corporation of New York
Filed Jan. 6, 1961, Ser. No. 81,130
7 Claims. (Cl. 318—181)

The invention described herein relates to motor control circuits and particularly to a method for starting synchronous motors.

Conventional synchronous motor designs employ pole mounted amortisseur windings and rely on induction motor principles for starting and accelerating the motor to nearly synchronous speed. Upon reaching this speed, direct current is applied to the rotor field winding for causing the rotor to pull into step with the field rotating around the stator.

In many installations, successful synchronous motor operation is obtained by using separately driven exciters for furnishing the necessary D.-C. voltage to the field winding. The recently developed brushless synchronous motor mounts an A.-C. exciter on the same shaft as the motor field winding and the exciter output to the field winding is rectified by shaft mounted rectifiers which furnish the unidirectional current to the field.

During the starting operation, if A.-C. voltage is applied to the stator and with the rotor at standstill, because of the large number of turns on the field poles, transformer action will induce a very high voltage in the field winding if it is open circuited. This is especially hazardous in the case of the brushless synchronous motor because of the likelihood of destroying the exciter rectifiers. The field winding therefore must be short-circuited through a resistor or otherwise protected to limit the voltage across the field winding and rectifiers to safe values. The torque resulting from current flow in the field winding at standstill then is small but represents an appreciable component of the total torque near synchronous speed.

With the winding shorted, in order to pull the connected inertia load into synchronism when the D.-C. field excitation is applied, the prior art teaches the use of field application relays which take the form of timers, or relays of special design, which are responsive to rotor speeds and act to apply the D.-C. voltage at the correct angle at pull-in. The equipment thus needed for pulling the motor into step not only involves large initial costs but it must be maintained to a high degree of perfection to permit performance of its intended function.

When the motor is operating at synchronous speed, the axes of the rotating poles lag behind the axes of the stator poles by the load angle. Should the torque required to be developed by the motor cause excessive displacement of the load angle, the magnetic lines of force which drag the rotor around then are not strong enough to hold it and the motor pulls out of step. If the field voltage is left on when the machine pulls out under load, the stator current increases, the power factor becomes rapidly lagging and severe current and torque pulsations arise which can cause destruction of the rotor and severely damage the machinery represented by the connected load. To safeguard the motor and connected equipment against possible damage, control devices sensitive to changes in load angle, power factor, or the like, must be included in the control circuitry furnished with the motor, thus involving high initial first and maintenance cost.

The electrical control equipment therefore needed to perform the functions of (a) applying D.-C. excitation at the proper speed and angle at pull-in, (b) shorting the field directly or through a discharge resistor during starting, (c) sensing when near synchronous speeds are reached and simultaneously applying field voltage and removing the short in the field winding, and (d) removing field excitation promptly on pull-out and inserting resistance in the field circuit, not only adds materially to the cost of the motor including its control equipment but also presents problems of adjustment and maintenance because of the many different types of relays and contactors which are needed to perform the above described functions. Although, synchronous motors of the type described above have proven highly successful and reliable in operation, when properly protected by appropriate control equipment, it is apparent that a great need exists for improvement in the starting circuits which would reduce the initial cost for control equipment and for eliminating the problems of adjustment and maintenance associated therewith.

The primary object of my invention therefore is to eliminate the involved control equipment presently used in starting and protecting a synchronous motor during operation.

Another object of my invention is to provide a control circuit for starting a synchronous motor without utilizing any mechanical or sliding parts.

Another object of my invention is to provide a control circuit for starting a synchronous motor wherein the field winding is automatically shorted during the starting operation without using any mechanically operating parts.

A further object of my invention is to provide an improved arrangement for starting a synchronous motor wherein D.-C. excitation is applied at the proper speed without the use of mechanically operating parts.

In carrying out my invention in its broadest form, I eliminate all sliding and mechanical type contactors used in the starting circuit for a brushless synchronous motor and replace them with static silicon controlled rectifiers and silicon diodes having no moving parts. The functions performed by such contactors are now handled exclusively by a pair of silicon controlled rectifiers and associated control elements such as zener diodes, used for causing firing of the silicon controlled rectifiers when predetermined voltage levels are reached. The preferred embodiment includes connecting in a parallel circuit, the silicon controlled rectifiers and associated zener diodes, motor field winding and the exciter rectifiers interconnecting the exciter output terminals with the motor field. Shorting of the motor field to carry the induced field currents during starting is accomplished by permitting the induced field current to flow through the exciter rectifiers when one terminal of the motor field winding is positive. When the other terminal becomes positive, upon rise in the induced voltage level to a point where the zener diode conducts, a small increase in voltage about that point, results in a large increase in current which is injected into the silicon controlled rectifier gate lead which turns it on to short the field and permits the induced current to flow in the rectifier-winding circuit. This arrangement effectively shorts the field during each cycle and allows acceleration of the motor to approximately synchronous speed. Application of D.-C. field voltage and pull-in at this time is accomplished when the exciter output increases and when the magnitude of the induced field voltage is reduced to a relatively low value. The circuit also provides the important function of immediately shorting the field without the use of contactors in the event the motor is pulled out of step. Re-synchronization is then accomplished in the same manner as during starting. Other circuit variations utilize the same principles for obtaining elimination of the contactors and for performing the same functions mentioned above. These circuit modifications will become more apparent as the description proceeds.

The subject matter which I regard as my invention is particularly pointed out and distinctly claimed in the concluding portion of this specification. My invention, however, both as to organization and method of operation, together with further objects and advantages thereof, may best be understood by reference to the following description taken in connection with the accompanying drawing in which:

FIGURE 1 is a schematic view of an improved motor control circuit used in starting a synchronous motor;

FIGURE 2 shows oscillograms A, B and C; A indicating the motor field current from near synchronism and at synchronism; B indicating the same conditions except the motor is operating at full load; and C showing the motor field current as the motor pulls out of synchronism by exceeding the pull out torque;

Figure 7:
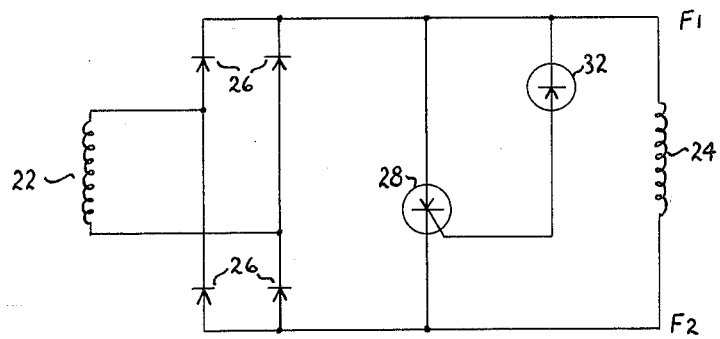

FIFGURE 6 is a modified field shorting circuit adapted for use with a half wave exciter; and FIGURE 7 is still another modification.

Figure 1:
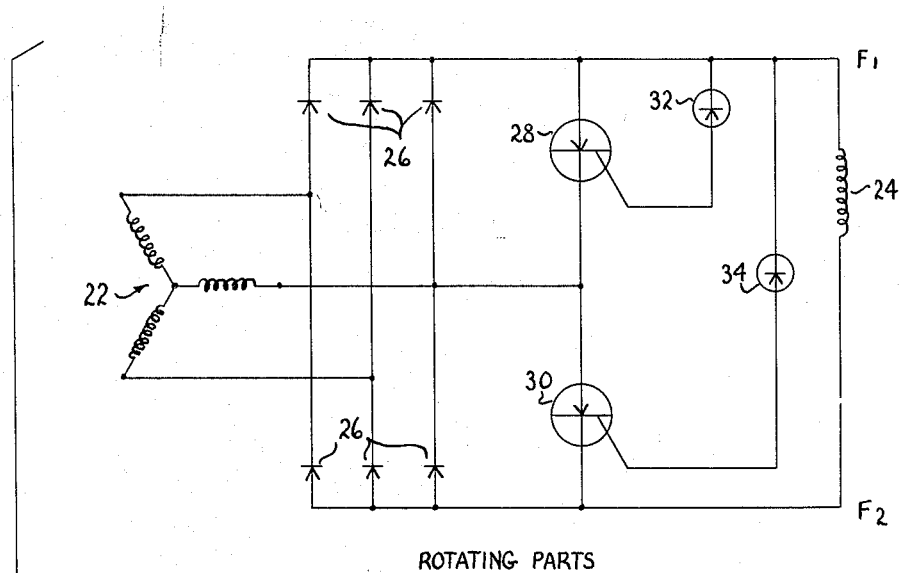
Figure 1:
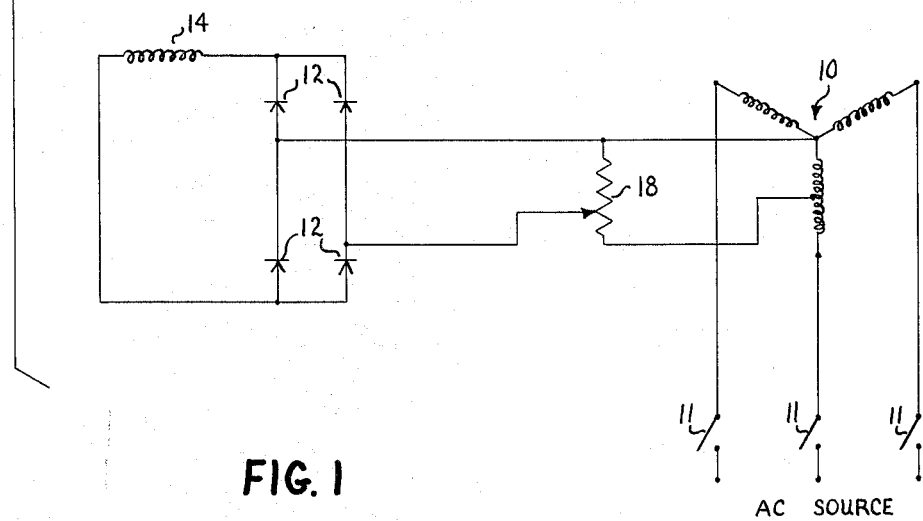

Referring now to the drawings wherein like reference characters designate like or corresponding parts throughout the several views there is shown in FIGURE 1, a schematic diagram for a brushless synchronous motor which is used for illustrating the invention. The conventional design for this type of machine includes a separate exciter and motor mounted in the same frame. The stator for each is equipped with windings arranged for electrodynamic cooperation with their respective windings in independent magnetic cores mounted on a single shaft. The exciter output is rectified by shaft mounted rectifiers for furnishing D.-C. voltage to the winding on the rotor of the motor.

As in conventional constructions, an amortisseur winding is located in the outer surfaces of the motor armature field poles which coacts with the stator winding to accomplish starting the rotor from rest to near synchronous speed. Induction motor principles accordingly are used for obtaining such starting and the construction for doing so is well known in the art. The lower part of FIGURE 1 illustrates a winding 10 in the motor armature which is connected to a power source through any suitable means, such as contactors 11. When the contactors are closed, power is supplied through the field rheostat 18 and rectifiers 12 to the exciter field winding 14 for providing the excitation necessary for establishing a stationary field in the air gap. It will be noted that the exciter field is excited upon closing of contactors 11 which supplied voltage to the motor.

The rotating section of the motor also comprises a pair of spaced magnetic cores each having a winding disposed therein but both cores mounted on the same shaft. The three-phase winding 22 in the exciter magnetic core, is connected to the motor field winding 24 through exciter rectifiers 26 located in each leg of the armature winding. Silicon controlled rectifiers 28 and 30 are connected across the exciter rectifiers and the motor field. Zener diodes 32 and 34 are connected to the motor field winding 24 and respond to induced voltages during starting for turning on the silicon controlled rectifiers when such voltages reach predetermined values.

As previously indicated, the motor field winding must be shorted during the starting period to carry the induced field current, and to prevent the application of harmful induced voltages which normally are of sufficiently high value to destroy the exciter rectifiers. When the terminal $F_2$ of the motor field is positive, induced field current can flow through the exciter rectifiers. However, when terminal $F_1$ is positive a path must be made available for current flow in the opposite direction which is not available in prior art constructions, without the use of auxiliary equipment. The silicon controlled rectifiers of this invention permit such opposite current flow and thereby effectively short the field. If these controlled rectifiers were not incorporated in the starting circuit, a large D.-C. component of current in the motor field would exist so that the motor would probably not start, even though the field voltage was not of sufficient magnitude to cause failure of any of the other components in the system. The reason for this is that the D.-C. field current creates a very large braking torque and tests performed at reduced voltages show that the motor rotates very slowly, approximately 10 r.p.m., and the braking torque prevents the motor from accelerating to synchronous speed.

Prior to proceeding to a description of operation of the improved starting circuit, consideration is now given to the operation of silicon controlled rectifiers and zener diodes adapted for use therewith.

The important characteristic of a silicon controlled rectifier is that when the anode is negative, it will not conduct. When the anode is positive, it will not conduct until it is turned on with a small current (50 milli-amperes) injected into the gate at a voltage of about three volts positive with respect to the cathode. The function of the zener diode is to provide this current and when it is introduced into the gate lead, the rectifier will switch on very rapidly, within about 4 micro-seconds, and when in a conducting state, has about the same voltage drop as a silicon rectifier which is in the neighborhood of one volt. The silicon controlled rectifier will remain in a conducting state until the forward current drops below about 0.02 ampere. Obviously, these precise numerical values will change with different sizes and types of controlled rectifiers.

The zener diode is used as a voltage reference to turn on the controlled rectifier at a predetermined voltage and cause it to fire. The zener diode volt-ampere characteristics are such that it will not conduct appreciable amounts of current until the avalanche voltage is reached. Upon reaching this voltage, a slight additional increase in voltage causes the diode to conduct large amounts of current but the voltage thereafter remains approximately constant with further increase in current.

Operation

In operation, when contactors 11 are closed and the armature winding 10 energized, a voltage will be induced in the amortisseur winding and the rotor will commence rotating to approximately synchronous speed according to well known induction motor principles. Simultaneously, power to the motor is rectified by rectifiers 12 for energizing the exciter winding 14 and thereby establishing a stationary field in the exciter air gap. The field created by the armature winding 10 also causes a large induced field current to flow in the motor field winding 24. If the field is not shorted to handle these high values of current, the induced field voltages usually will be high enough to damage the exciter rectifiers. Shorting of the field winding therefore is accomplished in my invention by the use of the silicon controlled rectifiers and more fully described hereafter.

During the early starting period, when terminal $F_2$ swings positive during any one cycle, the rectifiers 26 conduct, thus effectively shorting the field. During the other half of the cycle when the motor field terminal $F_1$ increases in the positive direction, the exciter rectifiers 26 block current flow and no current will flow through the zener diode 34 until its avalanche voltage is reached. At that time, a slight increase in voltage will result in enough gate current to turn on the controlled rectifier 30. After it turns on, all of the field voltage will then be impressed across controlled rectifier 28 and its associated zener diode 32 will inject sufficient current in it to turn it on in a manner similar to rectifier 30. The total time required to obain the above action is about 10 micro-seconds near zero speed with full voltage applied to the motor armature.

Preferably the avalanche voltage of the two zener diodes should be about the same in order to protect the controlled rectifiers.

With the field shorted and the motor accelerated by induction motor action to approximately full speed, the exciter will start to deliver some output. Exciter current is carried by the controlled rectifiers until the motor starts to pull into synchronism, at which time a greater reduction in the induced field current takes place, until at synchronous speed the induced current becomes substantially zero and all of the exciter output is applied to the motor field winding for producing the required torque needed for machine operation. At this time, the current flow through the controlled rectifiers drops to a sufficiently low value to turn them off.

Although exciters having widely different characteristics may be employed effectively in this combination, it is preferable that the exciter constitute a relatively soft source of current. That is, it should have high synchronous impedance so that it will not deliver excessive current into the controlled rectifiers used for shorting both the field and the exciter. Moreover, the exciter should be essentially a current amplifier with the magnitude of output current under short circuit conditions being only slightly greater than the output with normal resistance load.

In order to illustrate the effectiveness of using a pair of controlled rectifiers for shorting the motor field during starting, for applying D.-C. voltage to the motor field winding at the correct time and for showing how this circuit arrangement safeguards the machine against excessive current and torque pulsations when it pulls out of synchronism, the following information is presented showing the results obtainable. One motor tested had a rating of 50 H.P., 3-phase, 480 volts, .8 power factor, 1200 r.p.m., 6 pole brushless synchronous machine. The motor inertia was 23.1 lb. ft.$^2$. The NEMA requirements for the motor are:

MG1—8.15:
    Pull-out torque—175%
    Pull-in torque—100% with NEMA normal WK$^2$ load MG1—8.09A: Normal WK$^2$=23.5 lb. ft.$^2$ All tests were run with the motor coupled to a dynamometer which had a WK$^2$ of 128.75 lb. ft.$^2$ This is 5.5 times the normal WK$^2$ for the motor. Tests were taken in the form of oscillograms which show the performance of the motor and field shorting circuit under various conditions.

Figure 2:
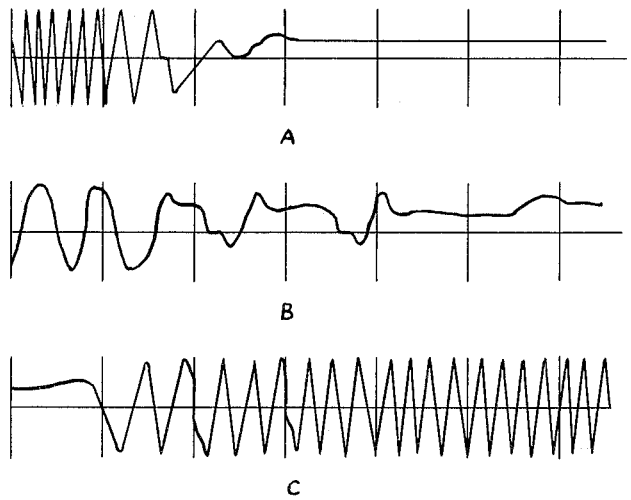

The oscillograms illustrated in FIGURE 2 clearly show the improved results. The oscillogram A shows full voltage acceleration with no load other than that of the dynamometer inertia. It shows that a uniform sine wave of current was induced in the field winding during starting and that the field remained shorted until the motor reached full speed when the D.-C. field current immediately started flowing to pull the motor into synchronism without any delay. FIGURE 2B shows the field current with full-load torque applied during acceleration. FIGURE 2C shows the field current as the motor is pulled out of step from full-load conditions. It can be seen that the field is immediately shorted on the first slip cycle. When the load torque is reduced, the motor will resynchronize. These waveforms clearly indicate complete and effective shorting of the field without the use of mechanical or other types of contactors otherwise necessary for obtaining starting of the motor. They further show with precision the action of both the induced and exciter currents during the complete speed range of the starting period and particularly what happens when synchronism is about to and does take place. The action of the current also is shown when the motor pulls out of step.

In the event one controlled rectifier is used in place of two for shorting the field, the D.-C. output of the exciter can supply current to keep the controlled rectifier turned on if the motor pulls into synchronism with reluctance torque. No load starting tests confirmed that this can happen. Acceleration under load was satisfactory with one controlled rectifier. The induced field current causes the controlled rectifier to turn off on each slip cycle and therefore gives it an opportunity to synchronize on each slip cycle. When the motor was in synchronism and the line braker opened and reclosed out of phase, the induced field transient could turn on the one controlled rectifier. The exciter output would keep it turned on until the motor pulled out of step so that the induced field current would turn off the controlled rectifier and give it a new opportunity to pull into step. If the motor were not loaded, it would stay in step with the controlled rectifier shorting the field.

When two controlled rectifiers are used as illustrated in FIGURE 1, the above problem does not arise. When the exciter is delivering normal D.-C. output, the controlled rectifiers are given an opportunity to turn off every cycle of the exciter output frequency. In the specific illustration shown, when one of the exciter rectifiers 26 in the upper part of FIGURE 1 is conducting, it had about one volt forward drop. This one volt is impressed upon controlled rectifier 28 in the reverse direction which turns it off. The situation is similar for controlled rectifier 30 with one of the rectifiers 26 in the lower part of the figure providing the reverse voltage.

Figure 3:
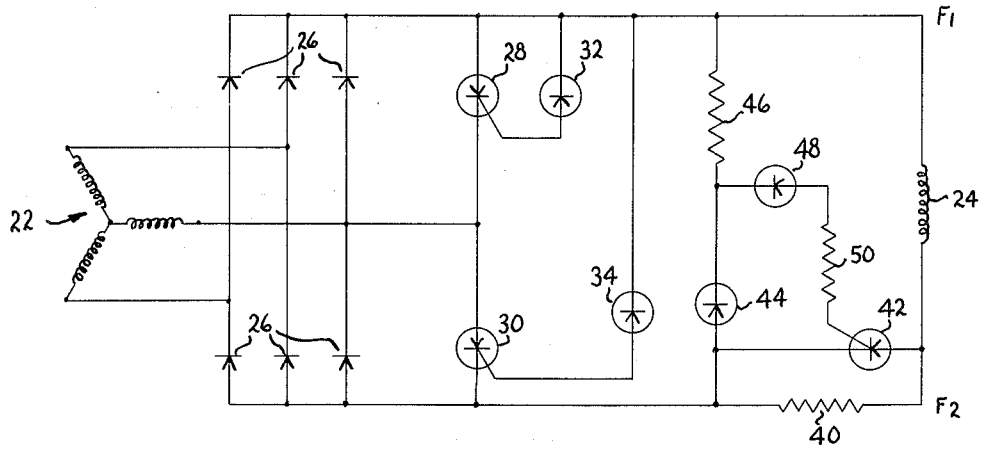
FIGURE 3 illustrates a modified arrangement utilizing a discharge resistor cooperating with silicon controlled rectifiers in the field shorting circuit.

It will be evident to skilled motor and motor control designers that in view of the teachings thus far described, many different variations in circuit arrangement may be resorted to for shorting the field during starting and thereafter protecting the motor upon pull out. FIGURE 3 shows such a variation wherein the arrangement of exciter and controlled rectifiers is as described in FIGURE 1 but includes a discharge resistor incorporated in the field circuit for obtaining increased accelerating torque for starting the motor. In this design, the two controlled rectifiers 28 and 30 short the output of the exciter in the same manner as that previously discussed. The additional elements include a discharge resistor 40 in series with the field. A silicon controlled rectifier 42 is connected across the discharge resistor 40. Zener diode 44 and resistor 46 are connected across the field and zener diode 48 and a resistor 50 being connected in circuit with the controlled rectifier 42 for controlling its operation. The function of controlled rectifier 42 is to short the discharge resistor 40 after the motor comes up to speed and starts to pull into synchronism.

During the starting period when terminal $F_1$ of the motor field is positive, induced field current flows through the discharge resistor 40 in a direction to impress inverse voltage across the controlled rectifier 42. It blocks current in this direction, thereby requiring the discharge resistor to carry all the current. When terminal $F_2$ becomes positive during the starting period, the current reverses and forward voltage is impressed on the controlled rectifier 42. It cannot turn on however because the gate is negative with respect to the cathode. Therefore, during acceleration the discharge resistor carries the induced field current 100% of the time.

When the motor is up to speed and the exciter starts to deliver D.-C. output to the motor field, terminal $F_1$ of the field becomes positive. At the same time, forward voltage is impressed across the controlled rectifier 42. Since the gate supply voltage is positive the controlled rectifier will turn on and short the resistor 40 and remain on as long as direct current flows in the motor field.

Figure 4:
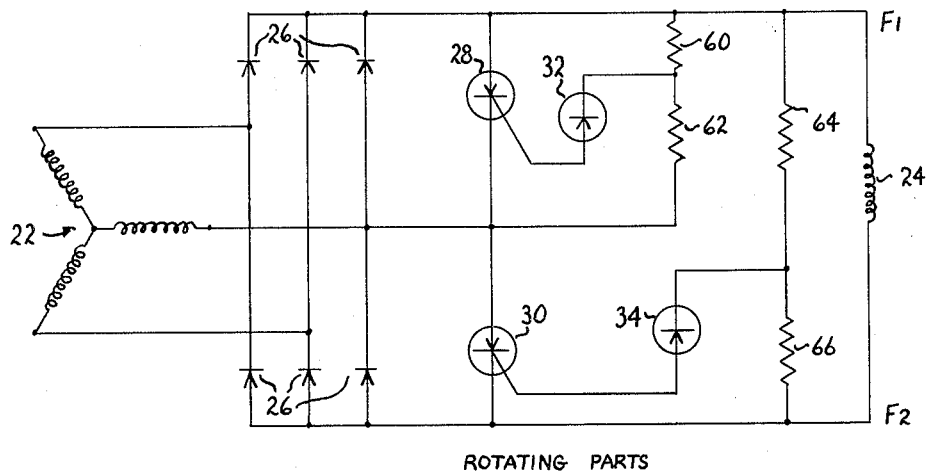
FIGURE 4 illustrates a zener diode firing circuit utilizing voltage dividers.

The zener diodes presently available have voltage ratings up to 200 volts. Present diodes can be operated in series to obtain whatever higher voltages are necessary. In the event adjustment of voltage is desired or if voltages higher than 200 are desired without using a series arrangement of zener diodes, voltage dividers can be used of the type shown in FIGURE 4. In the circuit shown, the firing circuit arrangement is the same as that shown in FIGURE 1 and appropriate modification to accommodate higher voltages exists in the form of resistors 60 and 62 which are connected to the zener diode 32. A similar arrangement of resistors 64 and 66 are connected across the motor field winding 24 and to the zener diode 34 in the same manner as described above. Shockley (PNPN) breakdown diodes can be substituted for the zener diodes. It may be possible in the future to secure controlled rectifiers with forward break-over voltages which are insensitive to temperature. If so, the zener diodes could be omitted and the circuit would operate in a similar manner with the field voltage rising to the break-over voltage of the controlled rectifiers and being shorted through the controlled rectifiers.

A comparison between the present magnetic field control panels and the silicon controlled rectifiers show that an adjustable relay is necessary to apply the field at the desired slip and at the optimum angle when the motor speed is approaching synchronism. In the arrangement described herein using silicon controlled rectifiers, the field is not applied until the motor accelerates to the required speed for pull-in. Since static types of control elements are used, no adjustment or maintenance is required for assuring optimum performance.

With respect to field removal on pull-out, the prior art required the use of special power factor sensing relays to sense the reduced power factor which exists when the motor pulls out of step. Removal of the field therefore in prior art circuit arrangements is accomplished only after the pull-out relay is properly adjusted. When using a silicon controlled rectifier however, no equipment is required other than the rectifier device itself. As soon as the motor pulls out of step, the induced field current causes immediate shorting of the field, and the motor will attempt to re-synchronize automatically without having to employ auxiliary devices for assisting in this function. Since no adjustment is required to the rectifier, there is no danger in allowing pull-out under torque before the field is removed, nor is there any likelihood of failing to obtain the complete protection necessary for the machine and the exciter rectifiers when this condition occurs.

As to amortisseur protection, the prior art required the use of a special relay in the field circuit for sensing both magnitude and accuracy of the field current. When properly adjusted, squirrel cage protection is provided up to about 65 or 75% speed. At greater speeds, protection is provided by thermal overloads in the stator circuit. When employing silicon controlled rectifiers in the starting circuit, the field circuit is not available for instrumentation because the motor has no brushes and protection therefore is obtained by sensing line current. In the event the required accelerating time is greater than the permissible stall time, the methods used to solve the same problem on squirrel cage induction motors may be applied. This involves the use of a timing relay and/or a device for sensing shaft rotation.

Figure 5:
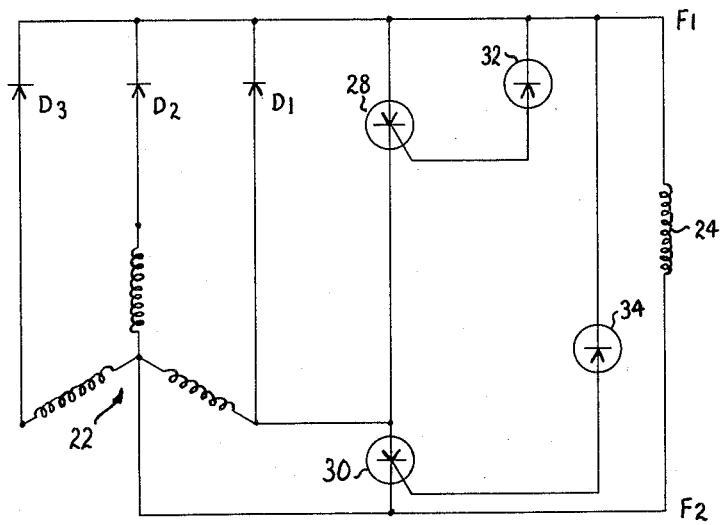
FIGURE 5 shows a field shorting circuit for use with a half wave exciter.

Referring now to FIGURE 5 which illustrates a schematic diagram of an automatic field shorting circuit for brushless synchronous machines using a half wave exciter the basic circuit arrangement of connecting silicon controlled rectifiers with a bridge rectifier circuit may also be applied to half wave rectifier circuits. The basic principle involved is that of connecting the controlled rectifiers across portions of the circuit that will apply reverse voltage to the controlled rectifier during a portion of the A.-C. cycle when the exciter is delivering D.-C. voltage in the normal manner. This enables the controlled rectifiers to turn off instead of being maintained in a conducting state by the output current of the exciter.

As illustrated, a 3-phase, half-wave exciter is shown which includes a field circuit having the field shorting controlled rectifiers 28 and 30. Rectifier 28 is connected across the exciter rectifier $D_1$ while controlled rectifier 30 is connected across the exciter phase that is in series with $D_1$. This combination then forms a path for short circuiting the motor field. The controlled rectifiers can be turned off when the exciter is delivering power due to the forward voltage drop of $D_1$ and the inverse voltage of the exciter phase that is connected across rectifier 30. As shown, these controlled rectifiers are turned on by the zener diode 32 and 34 in a manner similar to that previously discussed in relation to the three-phase bridge exciter. During the one-half cycle of induced voltage current when $F_2$ is positive a current will flow through the exciter armature windings and exciter rectifiers. During the one-half cycle when $F_1$ is positive, induced field current will flow through the two controlled rectifiers in series. Since this voltage drop will be twice that of the diodes, it will compensate somewhat for the additional voltage drop of the exciter winding. If necessary to balance the two impedances, a smaller resistance could be added in series with one of the controlled rectifiers. Alternatively, a diode may be connected across the exciter field to carry positive induced field current.

The steady-state peak voltage that rectifier 28 is exposed to is $\sqrt{3}$ times that applied to rectifier 30; thus rectifiers with different voltage ratings may be used if desired. It may also be desirable to reverse the polarity of the rectifiers and controlled rectifiers.

Figure 6:
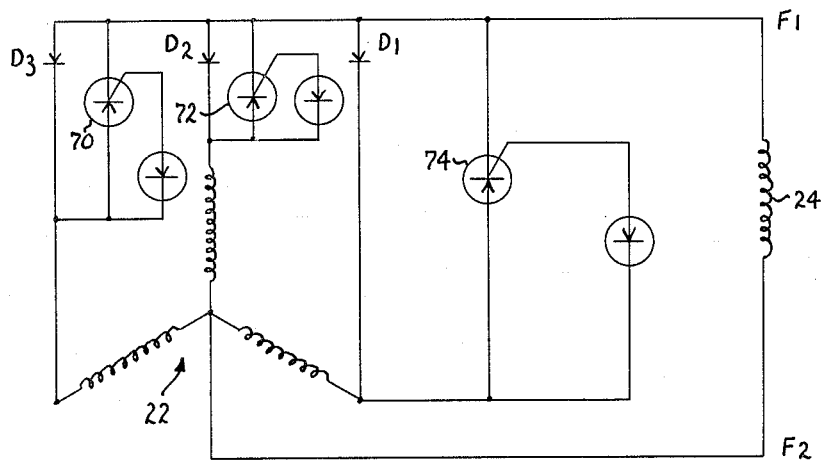

FIGURE 6 shows an alternative field shorting circuit for a half wave exciter. This consists of one controlled rectifier across each of the exciter rectifiers. Controlled rectifiers 70, 72 and 74 with their associated zener diodes are connected in circuit respectively with exciter rectifiers $D_1$, $D_2$ and $D_3$. The exciter rectifiers carry positive induced field current and the controlled rectifiers carry negative field current. The exciter zero sequence impedance will be in circuit for both polarities of current.

Since many alternative arrangements are possible, a slightly different variation of FIGURE 6 would be a circuit where the controlled rectifiers are turned on by either the rectifier voltage or the motor field voltage, whichever is the greater.

The principles illustrated in these circuits can be applied to other rectifier connections. For example, they are applicable to all half-wave rectifier circuits regardless of the number of phases. They could also be applied to the double-Y circuit with inter-phase transformer.

Another application of these principles involves the use of a single phase exciter rectifier, as shown in FIGURE 7, where a single controlled rectifier 12 is used to short the field. In the case of a single phase rectifier, the output voltage goes to zero twice per cycle of the exciter frequency. This allows the controlled rectifier to turn off twice per cycle and insures that the exciter output will not keep it turned on.

The field shorting circuit disclosed herein can be used to provide complete protection of generator rectifiers against over-voltage transients which may come from the generator field circuit under certain abnormal conditions of operation. The primary sources of these transients are:

(a) Synchronizing with another generator out of phase or synchronizing in phase with the other generator voltage considerably higher.
(b) Single phase line-to-line short circuit at the generator terminals, when the voltage is going through zero.
(c) Sustained out-of-step operation with the system.
(d) If the generator is connected to a system and a short circuit close to the terminals is maintained long enough for the flux to decay, re-application of system voltage in phase with the generator voltage will cause a negative field current.

Most small generators can be protected against all conditions, except (c), with a small voltage sensitive resistor, although it is not generally necessary to protect against condition (c). Where it is necessary to protect against out-of-step operation for more than a few cycles, the controlled rectifier field shorting circuit offers a practical method, since the controlled rectifiers are small and dissipate very little heat. The difficulty with voltage sensitive resistors, such as thyrite resistors, is that the voltage remains quite high, and this results in high power which can not be dissipated or stored if the generator is to be run out of step for more than a few cycles. Controlled rectifiers have a low impedance in the conducting state, so that the internal heat generation is relatively low.

Test results on a generator show that the field shorting circuit of the types disclosed in this application, provides adequate overvoltage protection to the rotating rectifiers. The field is shorted only during the time when high negative field current persists. The short is immediately removed, when it is no longer needed, to allow normal operation of the generator.

In view of the above, it will be evident that many modifications and variations are possible in light of the above teachings. It therefore is to be understood that within the scope of the appended claims, the invention may be practiced other than as specifically described.

What I claim as new and desire to secure by Letters Patent of the United States is:

1. A brushless synchronous machine comprising a synchronous motor and an exciter, each being equipped with windings and wherein the rotating magnetic cores for both the motor and exciter are mounted on the same shaft, rectifiers mounted on the shaft for rectifying the exciter output and providing direct current to the field winding in the motor, the improvement comprising at least one unidirectional switching device mounted on the shaft and connected across each of the motor field winding and the exciter output terminals for furnishing a path for one polarity of induced field current while the other polarity is carried by the exciter during starting.

2. A brushless synchronous machine comprising a synchronous motor and an exciter, each being equipped with windings and wherein the rotating magnetic cores for both the motor and exciter are mounted on the same shaft, rectifiers mounted on the shaft for rectifying the exciter output and providing direct current to the field winding in the motor, the improvement comprising at least one unidirectional switching device mounted on the shaft and connected across each of the motor field winding and the exciter output terminals for furnishing a path for one polarity of induced field current while the other polarity is carried by the exciter during starting, said switching device having a switching voltage low enough such that the voltage rating of the exciter rectifiers will not be exceeded and is high enough that it will not be switched on by the output from the exciter.

3. A brushless synchronous machine comprising a synchronous motor and an exciter, each being equipped with windings and wherein the rotating magnetic cores for both the motor and exciter are mounted on the same shaft, rectifiers mounted on the shaft for rectifying the exciter output and providing direct current to the field winding in the motor, the improvement comprising at least one unidirectional switching device mounted on the shaft and connected across each of the motor field winding and the exciter output terminals for furnishing a path for one polarity of induced field current while the other polarity is carried by the exciter during starting, and a control element connected between the field winding and the switching device for causing the switching device to conduct during the motor starting period until synchronism is reached.

4. A brushless synchronous machine comprising a synchronous motor and an exciter, each being equipped with windings and wherein the rotating magnetic cores for both the motor and exciter are mounted on the same shaft, rectifiers mounted on the shaft for rectifying the exciter output and providing direct current to the field winding in the motor, the improvement comprising two unidirectional switching devices mounted on the shaft and connected in series across the motor field winding and the exciter rectifiers, means connecting the midpoint of said switching devices to the exciter winding, thereby providing a path for one polarity of induced field current while the other polarity is carried by the exciter during starting.

5. A brushless synchronous machine comprising a synchronous motor and an exciter, each being equipped with windings and wherein the rotating magnetic cores for both the motor and exciter are mounted on the same shaft, rectifiers mounted on the shaft for rectifying the exciter output and providing direct current to the field winding in the motor, the improvement comprising two unidirectional switching devices mounted on the shaft and connected in series across the motor field winding and the exciter rectifiers, means connecting the midpoint of said switching devices to the exciter winding, and control elements connected between the devices and the motor field winding for separately controlling said devices, thereby providing a path for one polarity of induced field current while the other polarity is carried by the exciter during starting.

6. A brushless synchronous machine comprising a synchronous motor and a single phase exciter, each being equipped with windings and wherein the rotating magnetic cores for both the motor and exciter are mounted on the same shaft, rectifiers mounted on the shaft for rectifying the exciter output and providing direct current to the field winding in the motor, the improvement comprising at least one unidirectional switching device mounted on the shaft and connected across each of the motor field winding and the exciter output terminals for furnishing a path for one polarity of induced field current while the other polarity is carried by the exciter during starting.

7. A brushless synchronous machine comprising a synchronous motor and an exciter, each being equipped with windings and wherein the rotating magnetic cores for both the motor and exciter are mounted on the same shaft, rectifiers mounted on the shaft for rectifying the exciter output and providing direct current to the field winding in the motor, the improvement comprising two unidirectional switching devices mounted on the shaft and connected in series across the motor field winding and the exciter rectifiers, means connecting the midpoint of said switching devices to the exciter winding, and control elements connected between the devices and the motor field winding for separately controlling said devices, a starting resistor connected in series with the negative terminal of the exciter and the motor field winding, and another switching device connected across the resistor for shorting it after the motor reaches synchronism, and a control device for the switching device connected between the latter and the positive terminal of the field winding.

No references cited.